(12) United States Patent
Joppich-Dohlus et al.

(10) Patent No.: US 11,108,691 B2
(45) Date of Patent: Aug. 31, 2021

(54) METHOD FOR OPERATING A DATA RECORDING SYSTEM

(71) Applicant: DIEHL METERING SYSTEMS GMBH, Nuremberg (DE)

(72) Inventors: Petra Joppich-Dohlus, Rathsberg (DE); Thomas Blank, Merkendorf (DE); Stefan Schmitz, Nuremberg (DE); Achim Schmidt, Weissenohe (DE)

(73) Assignee: Diehl Metering Systems GmbH, Nuremberg (DE)

( * ) Notice: Subject to any disclaimer, the term of this patent is extended or adjusted under 35 U.S.C. 154(b) by 185 days.

(21) Appl. No.: 16/383,713

(22) Filed: Apr. 15, 2019

(65) Prior Publication Data

US 2019/0334816 A1    Oct. 31, 2019

(30) Foreign Application Priority Data

Apr. 28, 2018  (DE) .................... 102018003511.6

(51) Int. Cl.
*H04L 12/721*  (2013.01)
*H04L 1/16*  (2006.01)
(Continued)

(52) U.S. Cl.
CPC ............ *H04L 45/70* (2013.01); *H04L 1/1657* (2013.01); *H04L 5/0092* (2013.01);
(Continued)

(58) Field of Classification Search
CPC ..... H04L 45/70; H04L 1/1657; H04L 5/0092; H04L 45/304; H04L 63/0414;
(Continued)

(56) References Cited

U.S. PATENT DOCUMENTS

2013/0275736 A1    10/2013  Kelley et al.
2013/0293390 A1*   11/2013  Le Buhan ............. G08C 19/00
                                                340/870.02
(Continued)

FOREIGN PATENT DOCUMENTS

EP          2671052 B1      9/2016
WO    WO-2013024135 A1 *   2/2013  ............. G01D 4/004

OTHER PUBLICATIONS

Nederlandse Norm NEN-EN 13757-7: "Communication systems for meters—Part 7: Transport and security services" Aug. 2016.
(Continued)

*Primary Examiner* — Vinncelas Louis
(74) *Attorney, Agent, or Firm* — Laurence A. Greenberg; Werner H. Sterner; Ralph E. Locher

(57) ABSTRACT

A method operates a data recording system which has a central station, an intermediate station, and a terminal station. The central station and the intermediate station define a tertiary, two-way communication path and the central station and the intermediate station define a primary, two-way communication path via a radio link. A plurality of messages or message parts which have different validity time limits are generated in the central station on the basis of a command, the plurality of message parts which are valid for a limited time are transmitted from the central station to the intermediate station. The validity of the message parts is checked in the intermediate station, and, if a message part is still valid for transmission from the intermediate station to the terminal station, the message part concerned is transmitted within a message from the intermediate station to the terminal station.

18 Claims, 4 Drawing Sheets

(51) Int. Cl.
*H04L 5/00* (2006.01)
*H04L 12/725* (2013.01)
*H04L 29/06* (2006.01)
*H04L 29/08* (2006.01)
*G01D 4/00* (2006.01)

(52) U.S. Cl.
CPC ........ *H04L 45/304* (2013.01); *H04L 63/0414* (2013.01); *H04L 63/068* (2013.01); *H04L 63/0846* (2013.01); *H04L 67/12* (2013.01); *G01D 4/004* (2013.01); *H04Q 2209/60* (2013.01)

(58) Field of Classification Search
CPC . H04L 63/0846; H04L 67/12; H04L 63/0428; H04L 63/068; H04Q 2209/60; H04Q 9/00; G01D 4/004; H04W 12/04031
See application file for complete search history.

(56) References Cited

U.S. PATENT DOCUMENTS

| | | | |
|---|---|---|---|
| 2014/0361906 A1 | 12/2014 | Hughes et al. | |
| 2019/0141527 A1* | 5/2019 | Krishan | H04W 8/04 |
| 2019/0215302 A1* | 7/2019 | Chandramouli | H04L 12/66 |
| 2020/0288312 A1* | 9/2020 | Bala | H04W 12/04031 |

OTHER PUBLICATIONS

OMS—Open Metering System Specification, vol. 2, Primary Communication, Issue 4.1.2 / Dec. 16, 2016 Release.

* cited by examiner

METHOD FOR OPERATING A DATA RECORDING SYSTEM

CROSS-REFERENCE TO RELATED APPLICATION

This application claims the priority, under 35 U.S.C. § 119, of German application DE 10 2018 003 511.6, filed Apr. 28, 2018; the prior application is herewith incorporated by reference in its entirety.

BACKGROUND OF THE INVENTION

Field of the Invention

Data transmissions from metering units, such as e.g. sensors, consumption meters or components of smart home controllers, are becoming increasingly important in everyday use. One important field of application of metering units is the use of intelligent consumption data recording devices, also known as smart meters. These are normally consumption meters incorporated into a supply network, e.g. for energy, power, gas or water, which indicate actual consumption to the respective connection user and use a communication network to transmit the consumption data to the provider. Intelligent consumption meters offer the advantage that manual meter readings are no longer required and shorter-term billing can be implemented by the provider according to actual consumption.

Intelligent metering infrastructures are increasingly used to record consumption data. In these metering infrastructures (consumption data recording systems), the consumption meters represent the terminal devices by which measurement data are captured at the consumption points. The metering data are transmitted digitally from the consumption meters to a higher-level management system or head-end system. The head-end system manages the consumption data and communicates with the consumption meters. An intelligent metering infrastructure can comprise a large number of consumption meters. A simultaneous direct communication connection from all consumption meters to the head-end system is therefore often not possible as sufficient communication means are not available or the transmission bandwidths are too narrow. Data-collecting apparatuses, referred to as data collectors, are used so that the data recorded and transmitted by the consumption meters can nevertheless be transmitted as reliably and loss-free as possible to the head-end system. The data collectors are arranged in the communication path between the consumption meters and the head-end system. They collect the consumption data transmitted by the consumption meters on a communication path and act as buffer memories until the consumption data stored by them are retrieved by the head-end system. The data collectors can furthermore perform additional tasks, such as, for example, carrying out status queries in the consumption meters and providing the consumption meters with information and program codes, such as, for example, firmware and software updates and communication schedules.

Communication paths between data collectors and consumption meters are normally referred to as primary communication, whereas communication paths between data collectors and the head-end system are referred to as tertiary communication. Communication between adjacent data collectors via special interfaces which, however, normally require an additional radio interface is furthermore referred to as secondary communication.

The transmission paths normally used for primary communication from a consumption meter to a data collector normally differ from those used for tertiary communication from a data collector to the head-end system, since different requirements are imposed, for example in terms of transmission bandwidth, energy consumption, transmission quality, range and redundancy of the systems.

The commands are normally calculated and protected in the head-end system in order to guarantee secure and fault-free communication from the head-end system to the individual consumption meter. The head-end system generates a command or command sequence which is transmitted from the head-end system via the data collector to a consumption meter. This command or command sequence is encrypted or secured by the head-end system for this purpose. The encrypted or secured part of a message or a complete encrypted or secured message is then created by the head-end system from the encrypted or secured command or command sequence. Security parameters, such as e.g. encryptions or message authentication codes (MACs) are calculated for the protection. A time-variable parameter, such as e.g. the message counter (MC), can be incorporated into the calculations of the security parameters. Replay attacks, for example, can thereby be prevented in the communication protocol.

The keys required to calculate the security parameters are normally stored in the head-end system, but not in the data collector. A message or the part of a message for which a key is required is calculated accordingly in the head-end system, taking account of the security parameters, and is forwarded by the data collector to the corresponding consumption meter. Since the necessary keys are not stored in a data collector, the latter must request a new message from the head-end system in the event of a transmission fault or other security error between the data collector and the consumption meter.

A message counter which is used in message transmissions is described in the EN 13757 standard. The message counter is used for security purposes, such as e.g. to protect against replay attacks. If a consumption meter in a consumption data recording system receives a message from a communication partner, it checks the value of the message counter. If the value of the message counter is not within a specific defined range, the message is discarded as invalid. Otherwise, the value of the message counter is stored and is used for subsequent decryptions or authentication checks depending on the security mechanism that is used. However, a message cannot therefore retain its validity beyond the defined range. The sender of the message furthermore has no influence on the accepted validity period of the receiver and is thus subject to a time restriction beyond its own control.

SUMMARY OF THE INVENTION

The object of the present invention is to provide a novel method for operating a data recording system in which an increased temporal flexibility is enabled in the delivery of commands with an efficient use of the network bandwidth.

The present object is achieved by the overall teaching of the independent claim. Appropriate designs of the invention are claimed in the subclaims.

According to the invention, a method is provided for operating a data recording system, preferably a consumption data recording system, with a central station, in particular a head-end system, an intermediate station, in particular a data collector, and a terminal station, in particular a consumption meter. The central station and the intermediate station define a tertiary, two-way communication path, wherein the intermediate station and the terminal station define a primary, two-way communication path via a radio link. A message or message part which is valid for a limited time is created in the central station from a command using parameters, wherein the message or message part is transmitted from the central station to the intermediate station for the data transmission, and wherein the message or message part is forwarded from the intermediate station to the terminal station if the message or message part is still valid. In a characterizing manner, a plurality of messages or message parts which have different validity time limits are generated in the central station from a command, the plurality of message parts which are valid for a limited time are transmitted from the central station to the intermediate station. The validity of the message parts is checked in the intermediate station, and, if a message part is still valid for transmission from the intermediate station to the terminal station, the relevant message part is transmitted within a message from the intermediate station to the terminal station.

The time limit of an individual message or individual message part can thus be advantageously circumvented in a simple manner and the message or message part can be made available to the terminal station or consumption meter for a longer validity period. A plurality of message parts or messages with different validity time periods can be used. As a result, the data collector can deliver a command within a valid message or message part to the consumption meter with a higher probability. The recalculation of the message or message part on the basis of the command in the head-end system can thus be avoided in a greater proportion of cases. The command delivery process chain is thus simplified and accelerated. The message parts which have become invalid can be discarded. Similarly, following the delivery of a message or message part, the remaining message parts which are possibly still valid can be discarded.

At least one command can appropriately be contained as a part within a message or message part. A secured message or a secured message part can be created from the command in order to protect a command for security reasons. A message or message part containing the command in secured form can thus be created from the command. The command can form the encrypted or encryption-related part of the message if it is protected, for example, with security mechanisms, such as e.g. encryptions. The possibility exists for a plurality of commands to be contained as a part within a message or within a message part. This plurality of commands can, for example, form the encryption-related part of the message. A plurality of messages or message parts with different validity time periods can be used. The possibility thus exists for the message, in particular the command message containing the respective command or the plurality of commands as a part, to have a longer validity time period. The data collector can thereby deliver a command within a valid message to the consumption meter with a higher probability. The need to recalculate the message part containing the command in the head-end system can therefore be eliminated.

It is particularly appropriate if the message parts in each case containing the command differ from one another purely in terms of their different validity time limits. Apart from the different validity time limits, the message parts of the plurality of message parts may, for example, be identical.

The temporal validity of the respective message part can appropriately be defined by a time-variable parameter. The time-variable parameter may, for example, be a timestamp. It may furthermore be e.g. a counter which is incremented after a specific time interval and/or a specific event.

The time-variable parameter may advantageously be a message counter (MC). The central station may furthermore be a command message counter and the terminal station may use a consumption meter message counter. The use of a message counter offers the advantage that a protection against replay attacks is provided. The validity period can advantageously be increased by precalculating the plurality of message parts for a range of the message counter or the command message counter. The possibility exists, in particular, for a plurality of command messages to be precalculated for a range of the command message counter. No new hardware is required in the consumption data recording system and the method can thus be implemented as a software solution. The simple subsequent implementation facility incurs only low costs.

The possibility advantageously exists for the central station to use a different message counter, in particular a command message counter, for each message part when creating the plurality of message parts which are valid for a limited time. The command message counter can be incremented, for example, after each created message part. The message parts can thus, for example, be calculated for command message counters with continuous values. The value one, for example, can be used as an increment. The methods existing in consumption data recording systems for creating message parts on the basis of commands can thus be adopted, offering the advantage of a low implementation cost.

The transmission in the primary, two-way communication path can appropriately take place in time-limited reception windows. The consumption meters can, for example, open their reception windows for a limited time period after each transmission of consumption data.

It is particularly appropriate if the intermediate station determines the value of the time-variable parameter and selects a message part from the plurality of message parts on the basis of said value. The validity of a message part may depend on the previously used consumption meter message counter of the target consumption meter. The data collector can advantageously know the present consumption meter message counter or can define it e.g. by means of a message previously received from the consumption meter. This therefore offers the possibility of deferring the decision regarding the command message counter in the transmission. This offers the advantage of increasing flexibility in the ability to respond to unforeseen circumstances during the transmission. The data collector can thus make decisions independently and is not reliant on constant feedback from the head-end system.

It is advantageous for the time-variable parameter that is used to follow specific rules so that the message part selected by the data collector from the plurality of message parts can be recognized as valid by the consumption meter. The time-variable parameter of the message part can appropriately be accepted by the terminal station as valid if the time-variable parameter of the message part is greater than the time-variable parameter of the terminal station and the time-variable parameter of the message part is less than the sum of the value of the time-variable parameter of the terminal station and an integer value greater than zero. In one possible design, the command message counter can, for example, be accepted by the consumption meter as valid if the command message counter is greater than the consumption meter message counter and the command message counter is less than the sum of the consumption meter message counter and an integer value greater than zero. The integer value is defined, for example, as 100 in the European standard EN 13757. This offers the advantage that an implementation in accordance with the EN 13757 standard is possible.

The message part and/or the plurality of message parts, in particular within one or more messages, is/are transmitted from the head-end system via the data collector to the consumption meter and comprise(s) command application data. In order to increase security, the respective message part which comprises the command can appropriately contain security parameters. The command or the command application data can be protected with one or more security mechanisms or security parameters for this purpose. Encryptions and/or message authentication codes (MACs) can advantageously be provided as security parameters. The method can thus be implemented using existing security mechanisms.

A command, in particular as a message or as a part within a message, which is transmitted to the consumption meter can comprise a command message counter, security parameters into the calculation of which the command message counter is incorporated and/or command application data which in turn are protected with at least one security mechanism, for which purpose the command message counter can similarly be used. The consumption meter furthermore transmits meter application data to the data collector according to a transmission scheme, e.g., periodically at specific time intervals.

The consumption meter can appropriately be a two-way consumption meter. The same security mechanisms or security parameters as those used for the creation of message parts or messages on the basis of commands and/or command messages are used on the consumption meter side. Along with the key, the consumption meter also uses a message counter, the consumption meter message counter, for each message. The consumption meter message counter can be incremented after each transmitted message in the same way as the command message counter, for example by the value one. The consumption meter data which are transmitted from the consumption meter to the data collector can contain a consumption meter message counter, security parameters into the calculation of which the consumption meter message counter is incorporated and/or consumption meter application data which are protected with one or more security mechanisms or security parameters.

The security parameters which are incorporated into the calculation of the security mechanisms are appropriately available only in the central station and in the terminal station, but not in the intermediate station. If a message part or a plurality of message parts is/are intended to be sent to the consumption meter, it is necessary that all calculations for the message parts have already been performed in the head-end system. In order to calculate the message parts, the head-end system can, for example, use one or a plurality of different command message counters which are valid at the expected time of transmission of the message part within a message from the data collector to the consumption meter. Data which allow a calculation of the consumption meter message counter for a specific time can be stored in the head-end system for the precalculation of a valid command message counter. The head-end system can thus, for example, use a consumption meter message counter stored at an earlier time and the known transmission scheme of the consumption meter in order to calculate a valid command message counter for a specific time. The optional possibility exists for the head-end system to provide the created message parts or the encryption-related part of the message with an execution time and/or an earliest possible execution time. The flexibility of the data collector is thus increased with no danger of increasing the security risk, which could occur e.g. due to the storage of the keys for the security parameters in the data collector.

The temporary storage by the intermediate station of the plurality of message parts which have different validity time limits, preferably as a list, offers the advantage that the intermediate station can select a valid message part from the plurality of message parts at a later time and can forward it to the terminal station. As a result, it is not necessary for the data collector to select a valid message part immediately, in particular immediately on receiving the plurality of message parts from the head-end system, thereby increasing its flexibility and efficiency.

The central station can advantageously transmit the plurality of message parts which have different validity time limits to the intermediate station via tertiary communication paths. The command can thus be transmitted to the data collector, for example, in the form of a list consisting of a plurality of message parts as a tertiary command message. The communication paths present in the consumption data recording system can thus be used. The implementation can thus be completed in a simple manner, simultaneously incurring low costs.

The possibility furthermore exists for the intermediate station to transmit the selected message part to the terminal station via primary communication paths. The data collector can transmit the message part selected from the list, for example after receiving a consumption meter message indicating the provision of a reception window on the consumption meter side. The need may exist for the data collector to coincide with the consumption meter reception window when transmitting the message part or the message. If a consumption meter is only badly received by the data collector, it may occur that one or more message parts in the list are no longer valid at the time of a reception window. The message parts in the list can advantageously already be calculated by the head-end system in such a way that the defective reception of the target consumption meter is also taken into account.

The result of the command execution can advantageously be transmitted as feedback to the central station. The successful transmission of a command within a valid message part or valid message and/or the execution of the command by the consumption meter can appropriately be communicated to the head-end system. An unnecessary calculation, for example, of a further message part or a list of message parts can thereby be avoided. This offers the advantage that existing resources can be used sparingly by the feedback system.

Other features which are considered as characteristic for the invention are set forth in the appended claims.

Although the invention is illustrated and described herein as embodied in a method for operating a data recording system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following

DETAILED DESCRIPTION OF THE INVENTION

Figure 1A:
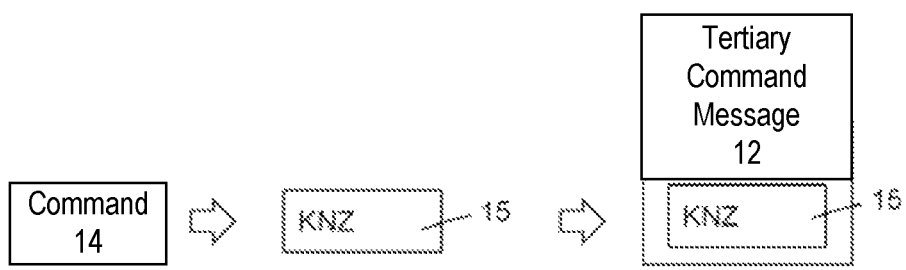
FIG. 1A-1B are illustrations of simplified schematic steps for creating a message.
Figure 1B:
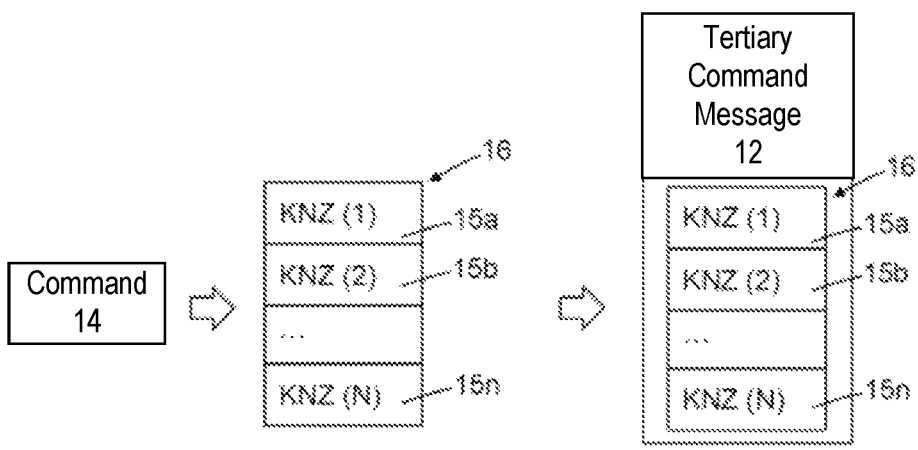

Referring now to the figures of the drawings in detail and first, particularly to FIG. 1A-1B thereof, there is shown simplified schematic steps for creating a tertiary command message 12 on a basis of a command 14 which is to be transmitted. In FIG. 1A, the command 14 is encrypted in the first step by a command message counter KNZ and forms a message part 15. In a second step, the command 14 encrypted in this way forms the message part 15 within a tertiary command message 12 which is transmitted from a head-end system 1 to a data collector 2. The validity of the message part 15 or the tertiary command message 12 depends on the validity of the command message counter KNZ that is used. In FIG. 1B, the command 14 is encrypted in a first step by means of a plurality of command message counters KNZ (1)-KNZ (N). A list of message parts 15a-15n with different encryptions is thus created on the basis of a command 14. In a second step, the plurality 16 of message parts 15a-15n encrypted in this way form the encrypted part of a tertiary command message 12. Since the command message counters KNZ (1)-KNZ (N) cover different validity periods, the validity of the command 14 within a message part 15a-15n or the validity of the tertiary command message 12 can be extended by the plurality 16 of encrypted message parts 15a-15n.

Figure 2:
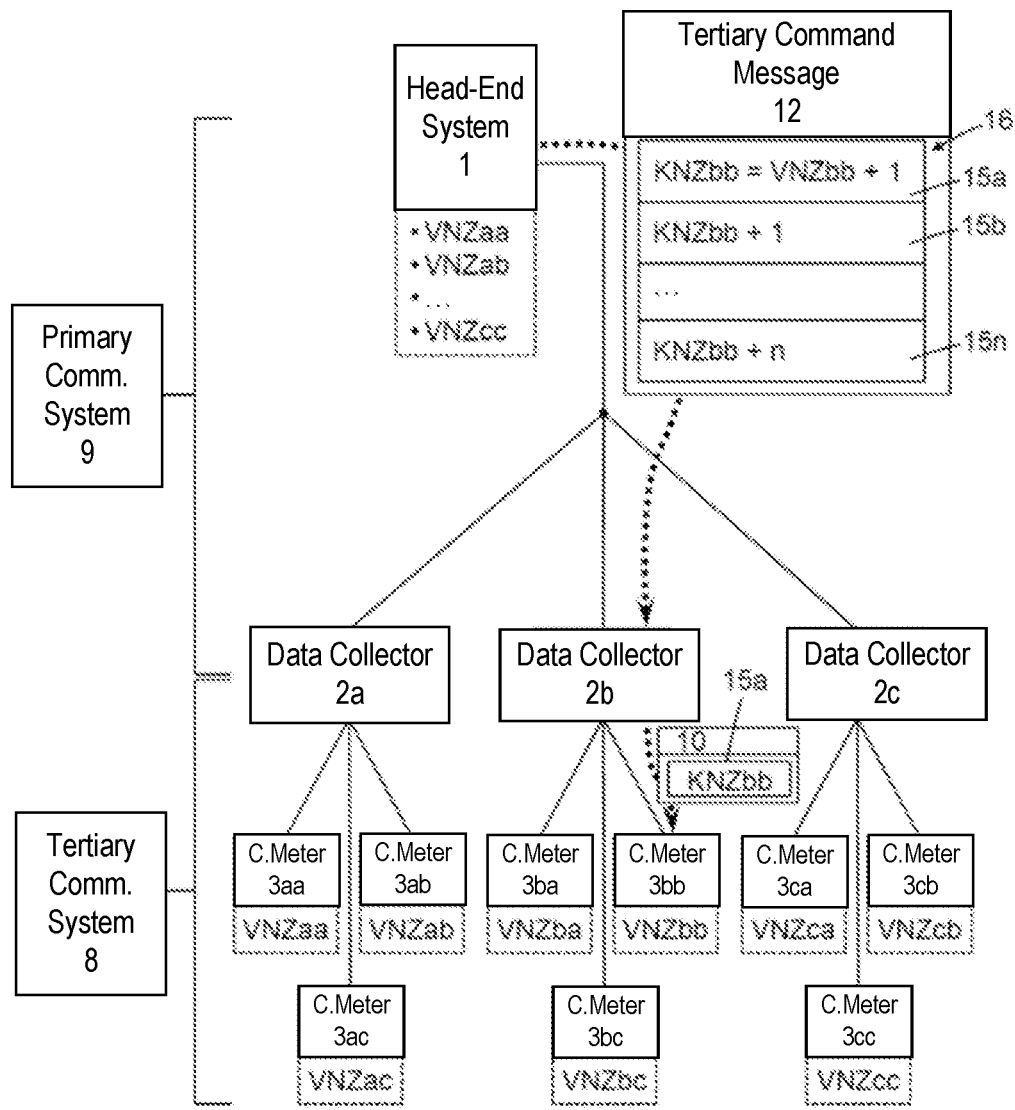
FIG. 2 is an illustration of an example of a consumption data recording system.

FIG. 2 shows a schematic view of a consumption data recording system via a radio link with a primary communication system 8 and a tertiary communication system 9. The tertiary communication system 9 contains a head-end system 1 and a plurality, e.g. three, of data collectors 2a-2c. The primary communication system 8 contains the aforementioned data collectors and a plurality of consumption meters, wherein three secondary consumption meters 3aa-3cc are shown by way of example for each data collector 2. The consumption meters 3aa-3cc are not connected directly to the tertiary communication system 9, but only indirectly via the corresponding data collectors 2a-2c.

Each consumption meter 3aa-3cc has an individual consumption meter message counter VNZaa-VNZcc. The individual consumption meter message counters VNZaa-VNZcc are stored in the head-end system 1. Data which allow a calculation of a consumption meter message counter VNZaa-VNZcc are furthermore stored for a specific time in the head-and system 1. If, for example, the transmission scheme or the transmission intervals of the consumption meter, e.g. 3bb, are stored in the head-end system 1, consumption meter message counters, e.g. VNZbb, can be precalculated. The head-end system 1 can thus define the required command message counters KNZ on the basis of the respective consumption meter message counters VNZaa-VNZcc in order to create the tertiary command message 12 with the plurality 16 of message parts 15a-15n. To do this, the command message counters KNZ must be greater than the respective consumption meter message counter VNZaa-VNZcc and e.g. less than the sum of the corresponding consumption meter message counter VNZaa-VNZcc and an integer value greater than zero.

For example, in order to transmit the command 14 to the consumption meter 3bb, the head-end system 1 creates a plurality 16 of message parts 15a-15n on the basis of the command 14, the message parts being created using the corresponding command message counters KNZbb. Thus, for example, the head-end system 1 bases the addressing of the consumption meter 3bb on the latter's consumption meter message counter VNZbb and increments the consumption meter message counter by the value one for the first message part 15a in order to obtain the command message counter KNZbb. For the further message parts 15b to 15n of the plurality 16 of message parts 15a to 15n, the command message counter KNZbb is in turn incremented in each case by the value one, up to an upper value n which may e.g. be 100. If the command message counter KNZbb is used for the encryption of the message parts 15a-15n on the basis of the command 14, the head-end system 1 thus creates a plurality 16 of message parts 15a to 15n with different encryptions. Each of these message parts 15a to 15n can form the encrypted part of a primary command message 10. The plurality 16 of message parts 15a to 15n created in this way are transmitted to the corresponding data collector 2b as a tertiary command message 12, the data collector temporarily storing the plurality 16 of message parts 15a to 15n, e.g. in the form of a list. The data collector 2b selects a valid message part 15a from the plurality 16 by comparing the command message counters KNZbb+1 to KNZbb+n that are used with the current value of the consumption meter message counter VNZbb of the consumption meter 3bb. The selected valid message part 15a, here e.g. KNZbb, is then transmitted as or within a primary command message 10 to the consumption meter 3bb.

Figure 3:
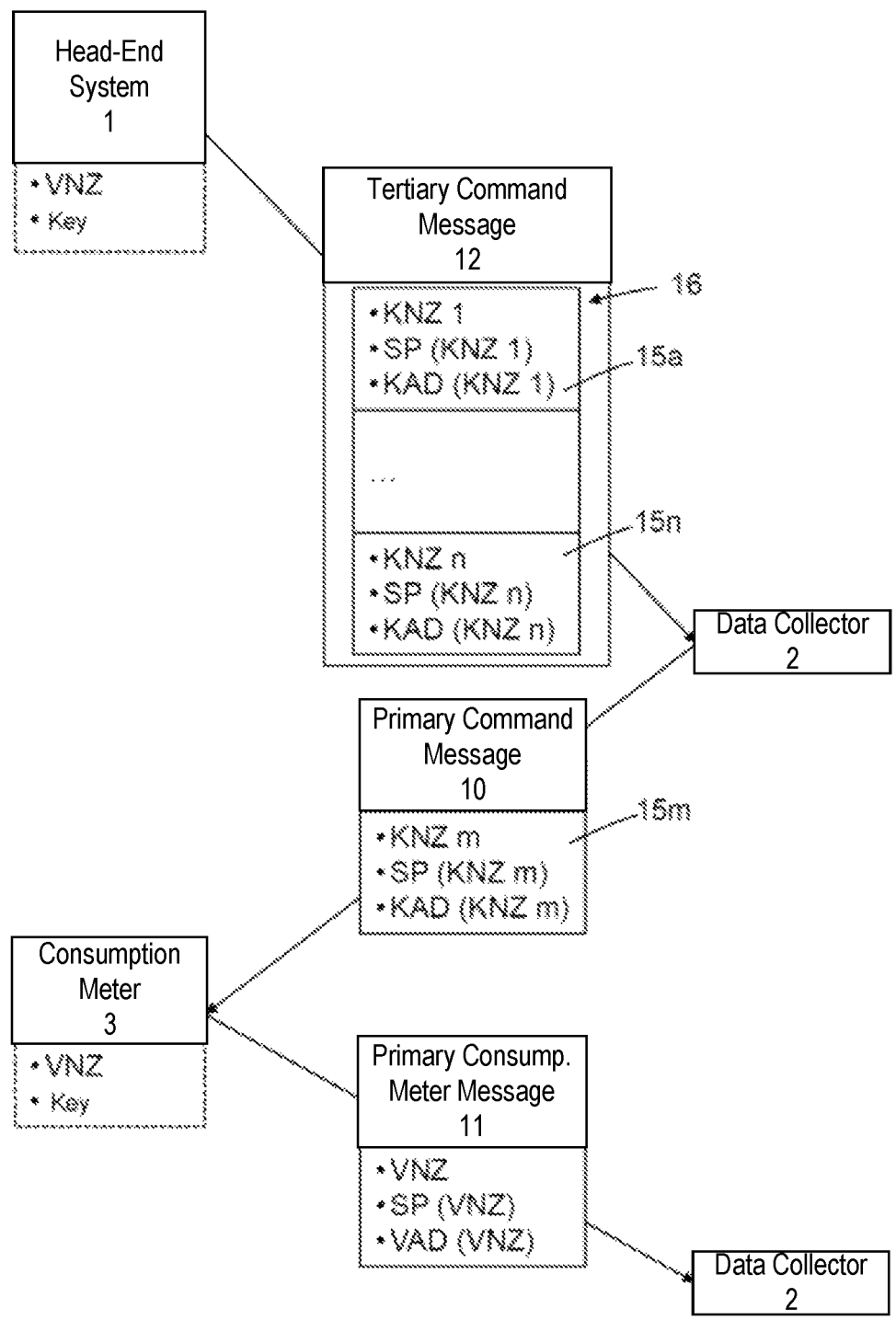
FIG. 3 is an illustration showing temporal sequence of a procedure for transmitting message parts on the basis of a command.

FIG. 3 shows a simplified schematic temporal sequence of the procedure for transmitting the command 14 from the head-end system 1 via the data collector 2 to the consumption meter 3. The head-end system 1 has the present consumption meter message counter VNZ of the target consumption meter 3 and keys for the security mechanisms. The message parts 15a-15n created on the basis of the command 14 contain command message counters KNZ 1-KNZ n, security parameters SP (KNZ 1)-SP (KNZ n), and e.g. MACs into the calculation of which the command message counter KNZ is incorporated, and also command application data KAD. The command application data KAD (KNZ 1)-KAD (KNZ n) are protected with one or more security mechanisms, such as e.g. MACs or encryption, for which purpose the command message counter KNZ is similarly used. The head-end system 1 generates a plurality 16 of message parts 15a to 15n on the basis of the command 14 to be transmitted, the message parts differing in that a different command message counter KNZ 1 to KNZ n is used for each message part 15a to 15n. The plurality 16 of message parts 15a to 15n thus comprise those which contain the command message counters KNZ 1-KNZ n, security parameters SP (KNZ 1)-SP (KNZ n) and command application data KAD (KNZ 1)-KAD (KNZ n).

The data collector 2 selects a valid message part 15m from the plurality 16 of message parts 15a to 15n and forwards it to the consumption meter 3. The selected message part 15m contains a command message counter KNZ m, security parameters SP (KNZ m) and command application data KAD (KNZ m), wherein m lies within the range from 1 to n.

The consumption meter 3 has a consumption meter message counter VNZ and keys to decrypt the security parameters. Only the head-end system 1 and the corresponding consumption meter 3 have the keys for the security parameters. The data collector 2 does not have the keys and can consequently neither decrypt the message parts 15a to 15n nor calculate and/or encrypt new message parts on the basis of the command 14.

The consumption meter 3 in turn transmits consumption meter application data VAD to the data collector 2 according to a specific transmission scheme, e.g. periodically after defined time intervals. For the calculation thereof, the consumption meter 3 uses the same security mechanisms as those which the head-end system 1 uses in calculating the message parts 15a to 15n. The consumption meter 3 uses a consumption meter message counter VNZ along with the key. The consumption meter message counter VNZ is incremented after each transmission, e.g. by the value 1. The primary meter message 11 thus contains the consumption meter message counter VNZ, security parameters SP (VNZ) and e.g. a MAC into which, for example, the consumption meter message counter VNZ is incorporated, and also the consumption meter application data VAD (VNZ) which are calculated with at least one security mechanism, such as, for example, a MAC and/or an encryption. The consumption meter message counter VNZ is similarly used for the generation of the consumption meter application data VAD (VNZ).

The corresponding command message counter KNZ m must follow specific rules so that the message part 15m forwarded by the data collector 2 is recognized as valid in the consumption meter 3. Rules of this type are described, for example in the EN 13757 standard. According to these rules, a message part 15m is valid only if the command message counter KNZ m is greater than the consumption meter message counter VNZ and the command message counter KNZ m is simultaneously less than the sum of the consumption meter message counter VNZ and a defined value, e.g. the value 100.

If the head-end system 1 sent only a single message part 15 on the basis of the command 14, the message part would retain its validity only as long as the command message counter KNZ lay within a defined range, for example the range defined by the consumption meter message counter VNZ in accordance with the EN 13757 standard. A periodic transmission scheme of the consumption meter 3 in which the consumption meter message counter VNZ is incremented by a specific value, normally the value 1, with each transmission results in a maximum time validity of a message part 15 calculated by means of the command message counter KNZ.

Figure 4:
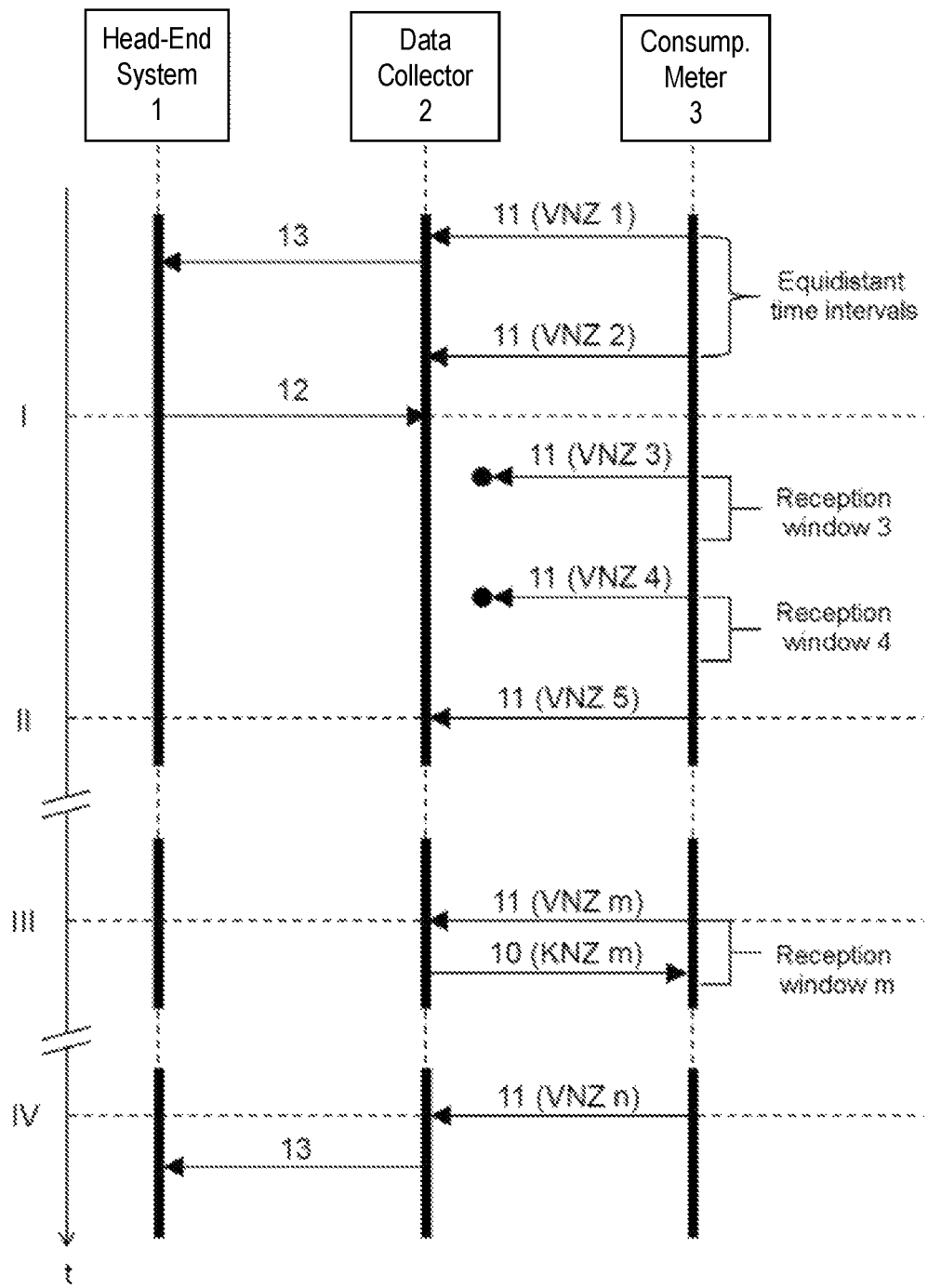
FIG. 4 is an illustration showing an example of a simplified transmission and reception sequence between a head-end system, a data collector and a consumption meter.

FIG. 4 shows the main transmission and reception sequences between the head-end system 1, the data collector 2 and the consumption meter 3 for the transmission and reception of a message part 15 on the basis of a command 14. The keys which are incorporated into the calculations of the security mechanisms are present only in the head-end system 1 and in the consumption meter 3. The data collector 2 does not have the corresponding keys. All calculations for a message part 15 on the basis of the command 14 from the head-end system 1 to the consumption meter 3 must therefore be performed in the head-end system 1. The head-end system 1 must use a command message counter KNZ which lies within the range of the valid command message counters KNZ at the expected time of delivery of the message part 15 from the data collector 2 to the consumption meter 3 so that the message part 15 calculated in the head-end system 1 is valid at the consumption meter 3. In order to use a valid command message counter KNZ, the head-end system can precalculate a command message counter KNZ, for example from a consumption meter message counter VNZ stored at an earlier time, using the known transmission scheme of the consumption meter 3.

The times of the possible reception windows of the consumption meter 3 are furthermore defined by the transmission scheme. This results in equidistant time intervals between the primary consumption meter messages 11. The consumption meter 3 opens the time windows for commands 14 within message parts 15 for a short time after the transmission of a primary consumption meter message 11. The exact time at which the data collector 2 can transmit the command 14 within a message part 15 to the consumption meter 3 depending on the execution time or on the command message counter KNZ is thus defined. The reception windows 3, 4 and m for the corresponding primary consumption meter messages 11 (VNZ 3), 11 (VNZ 4) and 11 (VNZ m) are thus shown by way of example in the drawing.

Instead of only one message part 15 on the basis of the command 14 with a command message counter KNZ valid at one future time, the head-end system 1 can advantageously calculate a plurality 16 of message parts 15a-15n on the basis of the command 14, the message parts in each case having a different command message counter KNZ and thus being valid at a different future time. The possible validity of one message part, e.g. 15a, on the basis of a command 14 from the plurality 16 of message parts 15a to 15n is checked by the data collector 2.

The main sequence in FIG. 4 begins with a primary consumption meter message 11 (VNZ 1) which has, for example, the consumption meter message counter VNZ 1. The consumption meter message counter VNZ is incremented after each message transmitted by the consumption meter 3, e.g. by the value 1. This primary consumption meter message 11 (VNZ 1) is received by the data collector 2 and is then forwarded, at least once, to the head-end system 1 as a tertiary consumption meter message 13. The possibility exists that not every primary consumption meter message 11 (VNZ 1) received by the data collector 2 is forwarded to the head-end system 1. The head-end system 1 stores the reception time and the consumption meter message counter VNZ 1 that is used. The head-end system 1 furthermore knows the transmission scheme of the consumption meter 3, so that future valid consumption meter message counters VNZ can be precalculated. The consumption meter 3 transmits the primary consumption meter message 11 (VNZ 2) as a second message which is received by the data collector 2.

At time I, the head-end system 1 sends a plurality 16 of created message parts 15c to 15m for the future consumption meter message counters VNZ 3 to VNZ m as a tertiary command message 12 to the data collector 2. The individual message parts 15c to 15m of the plurality 16 of message parts 15c to 15m can appropriately be provided with an optional execution time or an earliest possible execution time, wherein the execution time may also be e.g. immediately. The data collector 2 stores the plurality 16 of message parts 15c to 15m, e.g., in the form of a list, and, at the corresponding execution time, can check which message part 15 created on the basis of the command 14 is still valid by checking the current consumption meter message counter VNZ.

The primary consumption meter messages 11 (VNZ 3) and 11 (VNZ 4) are, for example, not received by the data collector 2. As soon as the data collector 2 receives the primary consumption meter message 11 (VNZ 5) at time II, the data collector 2 discards the message parts 15c and 15d from the plurality 16 of message parts 15c bis 15m with the command message counters KNZ 3 and KNZ 4 as invalid.

At time III, the data collector 2 receives the primary consumption meter message 11 (VNZ m) with the consumption meter message counter VNZ m. From the plurality 16 of message parts 15e to 15m, the data collector 2 selects the message part 15m with the command message counter KNZ m in order to transmit it in the reception window m as or within the primary command message 10 (KNZ m) to the consumption meter 3.

In order to transmit the result of the command execution to the head-end system 1, an acknowledgement is transmitted at time IV by the consumption meter 3 to the data collector 2 using a consumption meter message counter VNZ n. The data collector forwards the received acknowledgement as a tertiary consumption meter message 13 to the head-end system 1. Following the reception of the command 14 within a message part 15, the acknowledgement can be sent by the consumption meter 3 with the next primary consumption meter message 11 (VNZ n). Here, n would be an increment of m. The acknowledgement can only be sent at a later time.

The following is a summary list of reference numerals and the corresponding structure used in the above description of the invention:

1 Head-end system
2 Data collector
3 Consumption meter
8 Primary communication system
9 Tertiary communication system
10 Primary command message
11 Primary consumption meter message
12 Tertiary command message
13 Tertiary consumption meter message
14 Command
15 Message part
16 Plurality of message parts

The invention claimed is:

1. A method for operating a data recording system having a central station, an intermediate station, and a terminal station, the central station and the intermediate station define a tertiary, two-way communication path, and the intermediate station and the terminal station define a primary two-way communication path via a radio link, which comprises the steps of:
creating a message or a message part being valid for a limited time in the central station on a basis of a command using parameters;
transmitting the message or the message part from the central station to the intermediate station for a data transmission;
forwarding the message or the message part from the intermediate station to the terminal station if the message or the message part is still valid;
generating a plurality of message parts which have different validity time limits in the central station on a basis of the same command;
transmitting the plurality of message parts which are valid for a limited time from the central station to the intermediate station;
checking a validity of the message parts in the intermediate station; and
transmitting a message part concerned within a message from the intermediate station to the terminal station if the message part is still valid for transmission from the intermediate station to the terminal station.

2. The method according to claim 1, wherein the command is contained as a part within the message.

3. The method according to claim 1, wherein the message parts differ from one another only in terms of their different validity time limits.

4. The method according to claim 1, which further comprises defining a time validity of a respective message part by a time-variable parameter.

5. The method according to claim 4, wherein the time-variable parameter is a message counter.

6. The method according to claim 5, wherein the central station uses a command message counter and the terminal station uses a consumption meter message counter.

7. The method according to claim 5, wherein the central station, when creating the plurality of message parts which are valid for the limited time uses a different message counter for each of the message parts.

8. The method according to claim 5, wherein a transmission in the primary, two-way communication path takes place in time-limited reception windows.

9. The method according to claim 4, wherein the intermediate station determines a value of the time-variable parameter and selects the message part from the plurality of message parts on a basis of the value of the time-variable parameter.

10. The method according to claim 4, wherein the respective message part contains security parameters.

11. The method according to claim 10, which further comprises providing encryptions and/or message authentication codes as security parameters.

12. The method according to claim 10, wherein the security parameters are available only in the central station and in the terminal station, but not in the intermediate station.

13. The method according to claim 1, wherein the plurality of message parts which have different validity time limits are temporarily stored by the intermediate station.

14. The method according to claim 1, which further comprises transmitting, via the central station, the plurality of message parts which have different validity time limits to the intermediate station via tertiary communication paths.

15. The method according to claim 1, wherein the intermediate station transmits a selected message part to the terminal station via primary communication paths.

16. The method according to claim 1, which further comprises transmitting a result of a command execution as feedback to the central station.

17. The method according to claim 1, wherein:
the data recording system is a consumption data recording system;
the central station is a head-end system;
the intermediate station is a data collector; and
the terminal station is a consumption meter.

18. A method for operating a data recording system having a central station, an intermediate station, and a terminal station, the central station and the intermediate station define a tertiary, two-way communication path, and the intermediate station and the terminal station define a primary, two-way communication path via a radio link, which comprises the steps of:
- creating a message or a message part being valid for a limited time in the central station on a basis of a command using parameters;
- transmitting the message or the message part from the central station to the intermediate station for a data transmission;
- forwarding the message or the message part from the intermediate station to the terminal station if the message or the message part is still valid;
- generating a plurality of message parts which have different validity time limits in the central station on a basis of the command;
- transmitting the plurality of message parts which are valid for a limited time from the central station to the intermediate station;
- checking a validity of the message parts in the intermediate station; and
- transmitting a message part concerned within a message from the intermediate station to the terminal station if the message part is still valid for transmission from the intermediate station to the terminal station;
- wherein the time-variable parameter of the message part is accepted as valid by the terminal station if the time-variable parameter of the message part is greater than the time-variable parameter of the terminal station and the time-variable parameter of the message part is less than a sum of a value of the time-variable parameter of the terminal station and an integer value greater than zero.

* * * * *